United States Patent
Cretegny et al.

(10) Patent No.: US 7,326,892 B1
(45) Date of Patent: Feb. 5, 2008

(54) PROCESS OF MICROWAVE BRAZING WITH POWDER MATERIALS

(75) Inventors: Laurent Cretegny, Niskayuna, NY (US); David Edwin Budinger, Loveland, OH (US); Vasile Bogdan Neculaes, Niskayuna, NY (US); Holly Sue Shulman, Schenectady, NY (US); Morgana Lynn Fall, New Paltz, NY (US); Shawn Michael Allan, Troy, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 11/533,845

(22) Filed: Sep. 21, 2006

(51) Int. Cl.
*H05B 6/64* (2006.01)
*B23K 35/32* (2006.01)

(52) U.S. Cl. ............ 219/679; 219/759; 219/615; 219/85.12; 419/31; 419/44; 228/262.45; 228/262.51; 228/262.72

(58) Field of Classification Search ........ 219/678–679, 219/759, 615, 85.12–85.13; 228/262.3–262.9, 228/227, 232; 419/31, 44, 48–55
See application file for complete search history.

(56) References Cited

U.S. PATENT DOCUMENTS

| | | | |
|---|---|---|---|
| 4,147,911 A * | 4/1979 | Nishitani | 219/756 |
| 5,321,223 A | 6/1994 | Kimrey, Jr. et al. | |
| 5,397,530 A | 3/1995 | Narasimhan et al. | |
| 5,736,092 A | 4/1998 | Apte et al. | |
| 5,740,941 A | 4/1998 | Lemelson et al. | |
| 5,808,282 A | 9/1998 | Apte et al. | |
| 6,004,505 A | 12/1999 | Roy et al. | |
| 6,054,700 A * | 4/2000 | Rokhvarger et al. | 219/759 |
| 6,063,333 A | 5/2000 | Dennis | |
| 6,155,331 A | 12/2000 | Langer et al. | |
| 6,165,616 A | 12/2000 | Lemelson et al. | |
| 6,172,346 B1 | 1/2001 | Wroe | |
| 6,183,689 B1 | 2/2001 | Roy et al. | |
| 6,293,986 B1 | 9/2001 | Rodiger et al. | |
| 6,512,216 B2 | 1/2003 | Gedevanishvili et al. | |
| 6,610,241 B2 | 8/2003 | Shrout et al. | |
| 6,805,835 B2 | 10/2004 | Roy et al. | |
| 6,870,124 B2 | 3/2005 | Kumar et al. | |
| 2002/0106611 A1 | 8/2002 | Bhaduri et al. | |

FOREIGN PATENT DOCUMENTS

| | | |
|---|---|---|
| EP | 0456481 | 5/1991 |
| WO | WO 2004/073037 | 8/2004 |

* cited by examiner

*Primary Examiner*—Philip H. Leung
(74) *Attorney, Agent, or Firm*—Penny A. Clarke; Patrick K. Patnode (57) ABSTRACT

A process for heating a powder material by microwave radiation so that heating of the powder material is selective and sufficient to cause complete melting of the particles. The process entails providing a mass of powder comprising a quantity of filler particles of a metallic composition, and subjecting the mass to microwave radiation so that the filler particles within the mass couple with the microwave radiation and are completely melted. According to one aspect, the mass further contains at least one constituent that is more highly susceptible to microwave radiation than the filler particles, and the filler particles are melted as a result of heating by microwave radiation and thermal contact with the at least one constituent. According to another aspect, the powder mass is thermally pretreated to induce an irreversible increase in its dielectric loss factor prior to melting by microwave irradiation.

36 Claims, 4 Drawing Sheets

PROCESS OF MICROWAVE BRAZING WITH POWDER MATERIALS

BACKGROUND OF THE INVENTION

This invention generally relates to methods for heating powder materials, including processes and materials for use in the manufacturing, coating, repair, and build-up of superalloy components. More particularly, this invention relates to processes for significantly enhancing the melting of powders in a braze material by microwave energy.

Nickel, cobalt, and iron-base superalloys are widely used to form high temperature components of gas turbine engines. While some high-temperature superalloy components can be formed as a single casting, others are preferably or required to be fabricated by other processes. As an example, brazing is widely used to fabricate gas turbine components, as in the case of high pressure turbine nozzle assemblies. Brazing techniques conventionally encompass joining operations performed at an elevated temperature but below the melting point of the metals being joined. In carrying out the brazing process, an appropriate braze alloy is placed between the interface (faying) surfaces to be joined, and the faying surfaces and the braze alloy therebetween are heated in a vacuum to a temperature sufficient to melt the braze alloy without melting or causing grain growth in the superalloy base material. The braze alloy melts at a lower temperature than the superalloy base material as a result of containing a melting point suppressant such as boron. On cooling, the braze alloy solidifies to form a permanent metallurgical bond.

During engine operation, gas turbine engine components are subject to strenuous high temperature conditions under which various types of damage or deterioration can occur. As examples, erosion and oxidation reduce wall thicknesses of turbine nozzles and vanes, and cracks can initiate at surface irregularities and propagate as a result of stresses that are aggravated by thermal cycling. Because the cost of components formed from superalloys is relatively high, it is often more desirable to repair these components rather than replace them. In response, brazing techniques have been developed for crack repair and wall thickness build-up that entail placing a braze alloy filler metal on the surface area requiring repair, and then heating the filler metal in a vacuum to above its melting point, but below that of the surface substrate, so that the molten filler metal wets, flows, and fills the damaged area.

While widely employed to fabricate and repair gas turbine engine components, conventional brazing processes have notable disadvantages. First, the entire component must be subjected to a vacuum heat treatment, which is a very lengthy process in a production environment, unnecessarily exposes undamaged regions of the component to high temperatures, and can potentially remelt joints in other sections of the component. Furthermore, the braze alloy typically comprises elements similar to the base metal of the component, but with the addition of melting point suppressants (e.g., boron, silicon, etc.) that reduce its melting point below the base metal solidus temperature, thereby significantly altering its mechanical properties. Microwave brazing has been investigated as a potential candidate for eliminating these issues, as heating can be localized to selected areas of a component. Two approaches have generally been proposed for microwave brazing. A first entails the use of a susceptor (e.g., SiC enclosure) that is heated when exposed to microwave energy and, in turn, transfers the heat to the component by radiation. Drawbacks to this approach are lack of local heating of the braze alloy only, as an entire region of the component is inevitably heated, and significant heat loss from radiation in directions away from the intended brazement. A second approach entails direct microwave heating of metallic powders, which are significantly more susceptible to absorbing microwave energy than bulk metals, which reflect microwaves. However, typical braze alloy compositions do not couple sufficiently with microwave energy to be melted, with the result that the braze alloy powder is instead sintered and as a result has properties greatly inferior to the base metal of the component.

BRIEF SUMMARY OF THE INVENTION

The present invention generally provides processes for heating a powder material by microwave radiation so that heating of the powder material is selective and sufficient to cause complete melting of the particles. The invention is particularly beneficial for use in brazing operations, including the coating, repair, or buildup of a surface and the metallurgical joining of surfaces.

According to one aspect of the invention, a process is provided that generally entails providing a mass of powder comprising a quantity of filler particles of a metallic composition. The mass further contains at least one constituent that is more highly susceptible to microwave radiation than the metallic composition. The mass is then subjected to microwave radiation so that the filler particles within the mass couple with the microwave radiation and the at least one constituent within the mass preferentially couples with the microwave radiation. The at least one constituent is present in a sufficient amount so that the filler particles completely melt when subjected to heating by the microwave radiation and thermal contact with the at least one constituent. Thereafter, the microwave radiation is interrupted or discontinued to allow the mass to cool, solidify, and form a solid brazement.

According to another aspect of the invention, a process is provided that generally entails providing a mass of powder comprising a quantity of filler particles of a metallic composition, and then pretreating the mass so that the filler particles within the mass increase in temperature but do not melt, and undergo an irreversible increase in the dielectric loss factor thereof. On cessation of the pretreatment, the mass is allowed to cool, after which the mass is subjected to microwave radiation so that the filler particles within the mass couple with the microwave radiation to result in complete melting of the filler particles. The microwave radiation is then interrupted or discontinued to allow the mass to cool, solidify, and form a solid brazement.

From the above, it can be appreciated that the process of this invention can be applied to various processes in which heating of a powdered material is desired, for example, the forming of coatings including the repair or build-up of a damaged surface and the metallurgical joining of components by brazing. Because heating is by microwave radiation, the heating rate and melting of the powder particles are influenced by susceptibility to microwave radiation instead of location relative to a heating source or relative to any surface contacted by the powder mass. With the addition of one or more constituents with greater susceptibility than the filler particles and/or the thermal pretreatment, greater susceptibility to microwave radiation can be induced in the powder mass to promote complete and rapid melting of the mass and its particles. This aspect of the invention enables the powder mass to melt prior to melting of a surface contacted by the region. As a result, the powder particles can be formed of an alloy having the same melting temperature (for example, within 150° C.) as the surface contacted by the powder mass.

Other objects and advantages of this invention will be better appreciated from the following detailed description.

DETAILED DESCRIPTION OF THE INVENTION

The invention will be described with specific reference to processing of components for a gas turbine engine, and particularly the fabrication and repair of such components with a braze material. However, the invention has application to a variety of components, materials, and processes other than those discussed, and such variations are within the scope of this invention.

Figure 1:
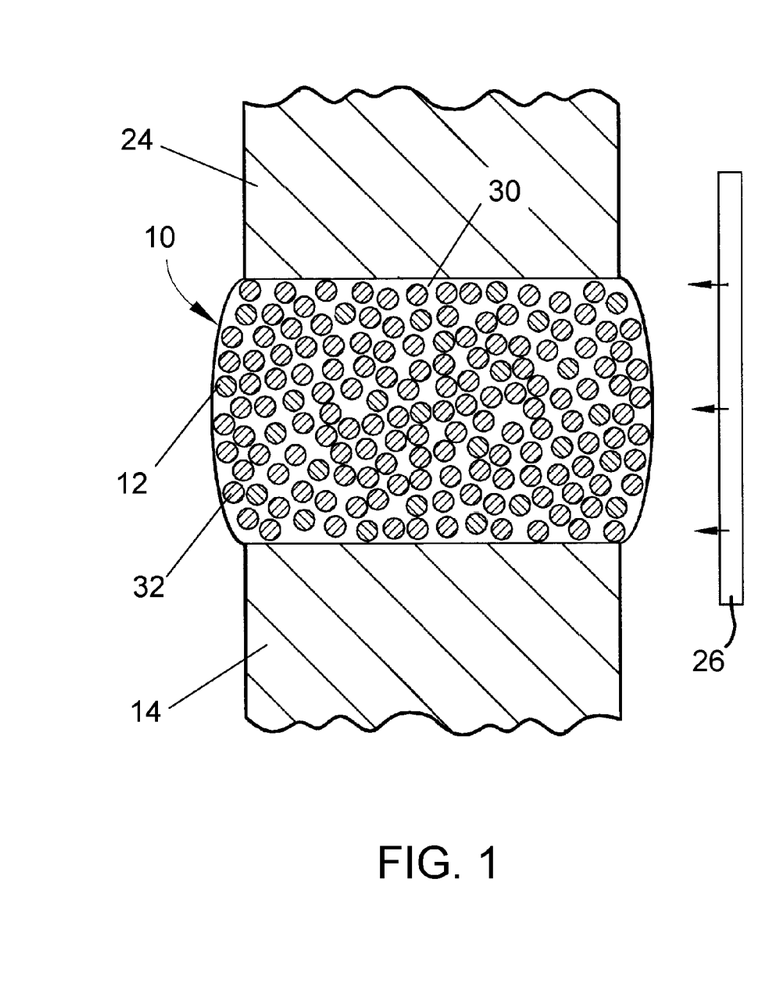
FIG. 1 schematically represents a mass of powder particles between a pair of substrates, in which the mass includes filler metal particles and particles with greater susceptibility to microwave heating than the filler metal particles to promote microwave brazing in accordance with an embodiment of the present invention.
Figure 2:
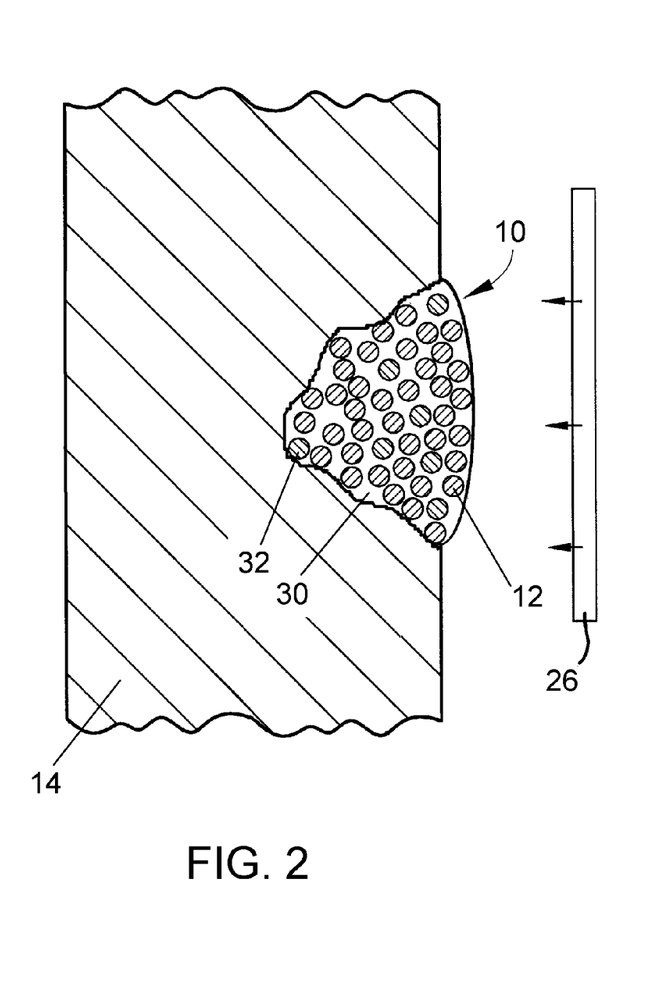
FIG. 2 schematically represents a mass of powder particles similar to that of FIG. 1 but filling a defect in a surface of a substrate in accordance with the invention.

FIGS. 1 and 2 depict embodiments of this invention, in which consistent reference numbers are used to identify functionally similar structures. FIG. 1 schematically represents a mass 10 of filler metal particles 12 between and contacting opposing surfaces of two substrates 14 and 24 to be metallurgical joined by the particles 12, and FIG. 2 schematically represents a mass 10 of filler metal particles 12 within a defect in a surface of a substrate 14 for the purpose of repairing the surface. In both FIGS. 1 and 2, the particles 12 are shown as being contained within a binder 30 that, according to known brazing practices with braze pastes, burns off during the brazing process, which is preferably preformed in an inert or low pressure atmosphere to minimize oxidation of the particles 12 and any surfaces (e.g., substrates 14 and 24) to which the particles 12 are bonded. In combination the substrates 14 and 24 represent surface regions of two components intended to be joined together by brazing, whereas the substrate 14 of FIG. 2 may be a surface region of a gas turbine engine component to be repaired by brazing. Either or both substrates 14 and 24 may be formed of a superalloy, whose composition(s) will depend on the particular type of component and its anticipated operating conditions. As will be noted below, various other metallic and nonmetallic materials are also possible for the substrates 14 and 24, and therefore within the scope of the invention.

The powder particles 12 can be formed of a variety of materials, limited only by the requirement that the particles 12 are capable of being heated when subjected to microwave radiation 26 and are compatible with the materials of the substrates 14 and 24 while at the maximum heating temperature induced by microwave radiation 26. Materials capable of being heated when subjected to microwave radiation include non-conductors and conductors under appropriate conditions. Because microwave radiation has varying electric and magnetic fields, direct electric heating will be significant in certain materials, while other materials will be heated mostly through magnetic effects (e.g., small metal particulates and spheres). In the embodiments of the invention in which the substrate 14 is a surface region of a component to be repaired or the substrates 14 and 24 are surface regions of components to be metallurgically joined, the particles 12 can be formed of a braze alloy that is metallurgically compatible with the substrates 14 and 24. Compatibility is assured if the particles 12 have the very same composition as that of the substrates 14 and 24, though suitable compatibility can also be achieved if the particles 12 and substrates 14 and 24 do not have compositions prone to detrimental interdiffusion at elevated temperatures that would lead to loss of desired mechanical or environmental properties. The filler metal particles 12 may be a conventional braze alloy that contains significant amounts of one or more melting point depressants (such as boron or silicon), a superalloy such as of the type used in turbine applications, or an alloy whose base composition is a superalloy modified to contain limited additions of one or more melting point suppressants. As such, the particles 12 may contain one or more melting point suppressants, though preferably not at levels that would lead to an unacceptable loss of properties in the substrates 14 and 24 if a significant amount of the suppressant was to diffuse into the substrates 14 and 24 during heating of the particles 12 and later during the life of the substrates 14 and 24. As will be discussed in more detail below, all of the particles 12 are not required to have the same composition, but instead particles 12 of different compositions may be combined to form the powder mass 10.

According to a preferred aspect of the invention, the composition of the powder mass 10 is tailored to significantly enhance the heating and melting of the particles 12 by the microwave radiation 26. To improve the microwave radiation heating of the particles 12 beyond the melting point(s) of the alloy(s) from which they are formed, one or more of the following options are undertaken. A first option is to add a microwave-susceptible material to the filler metal particles 12 to serve as an in-situ couplant to the microwave radiation 26. Ideally, such a material is metallic in nature and allows intimate mixing with the alloy of the filler metal particles 12 upon melting to minimize the formation of discontinuities in the resulting brazement (braze repair or braze joint) that would adversely affect its mechanical properties. A second option is to modify the powder mass 10 to contain one or more materials capable of undergoing an irreversible increase in microwave coupling behavior when exposed to an elevated temperature, and then performing a thermal pretreatment on the mass 10 to irreversibly raise the susceptibility of the material to microwave radiation, which in turn ensures better heating of the mass 10 when exposed to the microwave radiation 26 during the brazing process. Each of the above options can be used alone or in combination, and/or in further combination with a technique for accelerating and enhancing coupling between the microwave radiation 26 and the particles 12 by using particles 12 of multiple sizes and distributing such particles 12 in various mixing and/or layering techniques, as disclosed in related U.S. patent application Ser. No. 11/480,652, the contents of which relating to the this technique are incorporated herein by reference. Finally, each of the above options are further believed to benefit from pre-heating the substrate 14 or substrates 14 and 24 just prior to microwave brazing to enhance the susceptibility of the filler metal particles 12 to the microwave radiation 26, thereby improving the energy absorbed by the particles 12 and facilitating melting of the particles 12.

With regard to the first option, in which the powder mass 10 contains one or more materials that are highly susceptible to microwave radiation and, in powder form, preferentially couple with microwave radiation, a high-susceptibility material is indicated in FIGS. 1 and 2 as being in the form of separate particles 32 mixed with the filler metal particles 12. Alternatively, the high-susceptibility material could be alloyed with the alloy of some or all of the filler metal particles 12. Suitable high-susceptibility materials must not only be capable of absorbing microwave energy, but are preferably capable of dissolving in the alloy of the particles 12 when molten without creating inhomogeneities in the resulting repair or joint that would act as stress concentrators. Furthermore, suitable materials must be sufficiently conductive to generate eddy currents induced by the magnetic field of the microwave radiation, while also possessing a level of electrical resistivity capable of generating joule heating from the eddy currents. Particularly suitable materials are believed to include, but are not limited to, silicon, germanium, gallium, cobalt, iron, zinc, titanium, carbon (e.g., carbon nano-tubes or fine graphite powder), aluminum, tantalum, niobium, rhenium, hafnium, and molybdenum. Certain materials known to be highly susceptible to microwave heating but potentially detrimental to a braze repair or joint, for example, ceramic materials such as silicon carbide (SiC), are believed to be practical for use in the present invention if added in sufficiently limited amounts and uniformly distributed throughout the resulting brazement. Suitable high-susceptibility materials can be added in amounts of, by weight, up to about 50% and more preferably about 1 to about 25% of the particles 12.

Figure 3:
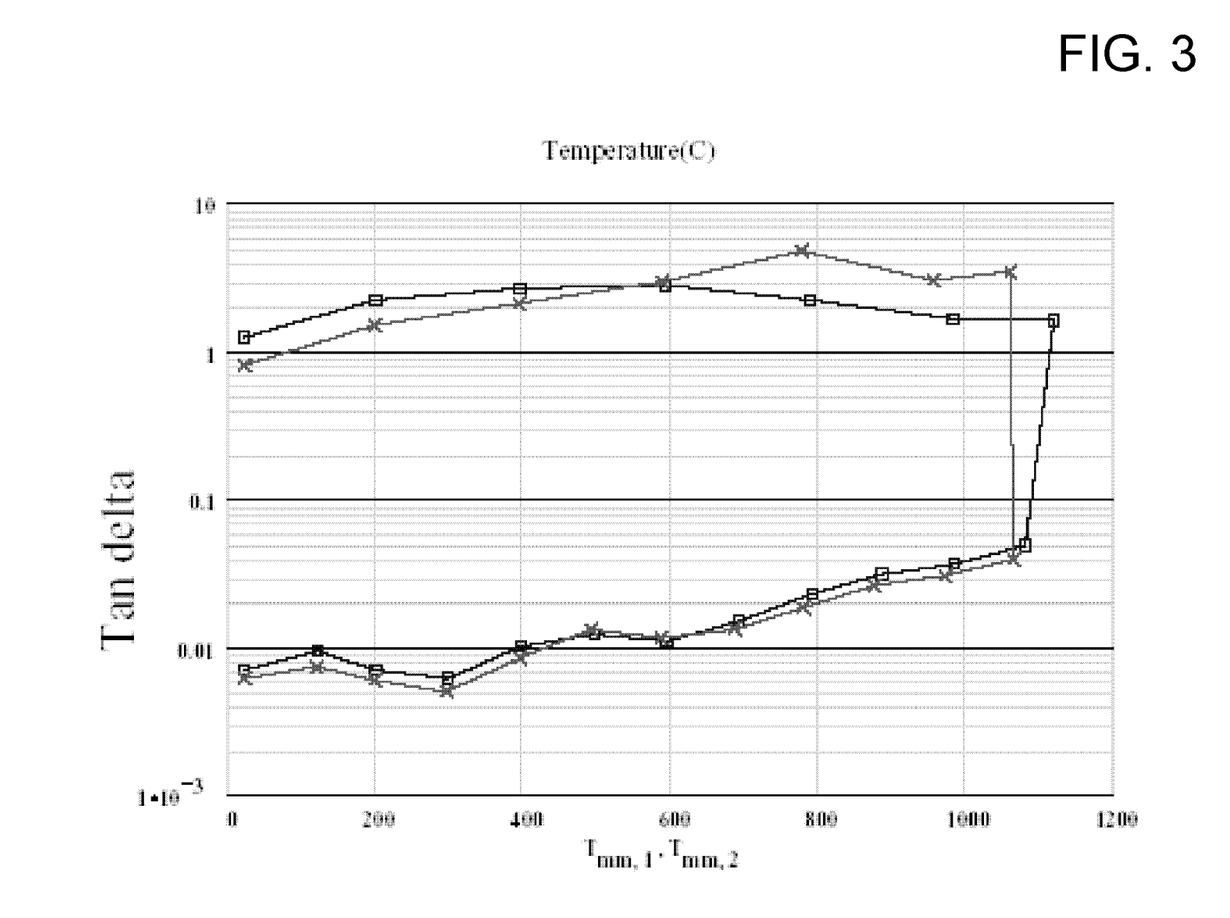
FIG. 3 is a graph plotting dielectric measurements taken of a silicon powder exposed to microwave radiation while at about 1200° C., and evidencing an irreversible increase in tan delta of the powder material corresponding to an irreversible increase in microwave coupling behavior of the material.

According to the second option, prior to brazing the filler metal particles 12 are subjected to a thermal pretreatment, such as exposure to a microwave field while at an elevated temperature or simply by heating using any conventional heating technique. This approach is based on certain elements experiencing an irreversible increase in their microwave coupling behavior when exposed to sufficiently elevated temperatures. As will be discussed below, FIG. 3 is a graph plotting dielectric measurements taken of a silicon powder exposed to microwave radiation while at about 1200° C. The data evidence a two order of magnitude (i.e., 100×) irreversible increase in tan delta, the tangent of the dielectric loss angle ($\delta$). Tan delta multiplied by the dielectric constant (k) of the material yields the dielectric loss factor, and is therefore a measure of dielectric loss (the rate of transformation of electric energy into heat for a dielectric material subjected to a changing electric field). As such, tan delta is a useful measurement for quantifying the efficiency with which electromagnetic (e.g., microwave) energy is converted to heat by a material. Based on the data in FIG. 3, the silicon powder would be expected to exhibit an approximately 100× stronger coupling if subsequently exposed to microwave radiation, resulting in significantly better heating of a powder whose filler metal particles 12 contained or were intermixed with silicon. Similar results are believed to be obtainable with a powder mass 10 containing any one or more of the other high-susceptibility materials noted above in a total amount of about 1% to about 50% by weight. A suitable implementation of this approach is to pretreat a powder of filler metal particles 12, optionally containing or intermixed with one or more high-susceptibility materials, prior to mixing the particles 12 with the binder 30 or applying the resulting powder mass 10 to the surface or surfaces to be brazed.

Because bulk metals such as the substrates 14 and 24 tend to reflect microwave radiation, this approach to the present invention makes possible the brazing of superalloy substrates 14 and/or 24 with alloys having the very same composition as the substrate 14/24, as well as alloys with the same or even higher melting point as the substrate 14/24. For example, a nickel-base superalloy component can be joined or repaired with a braze material of the same nickel-base superalloy composition or another nickel-base alloy, in other words, an alloy whose base metal is the same as the base metal of the substrate 14/24. In this manner, degradation of the properties of the substrate 14/24 resulting from interdiffusion with the braze material can be essentially if not entirely avoided. In view of the capability of melting particles 12 formed of an alloy having a melting point above that of the substrate 14/24, it should be appreciated that the term "brazing" as used herein is not limited to the conventional limitation of a joining operation performed at a temperature below the melting point of the metals being joined.

Figure 4:
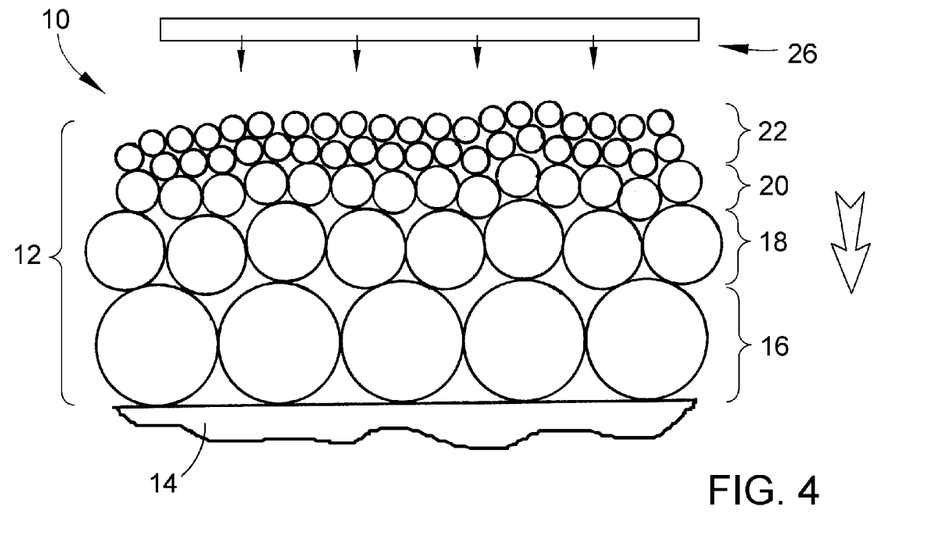
FIG. 4 schematically represents a mass of powder particles on a substrate and arranged according to particle size for microwave heating of the particles to coat, repair, or build-up the substrate in accordance with an embodiment of the present invention.
Figure 5:
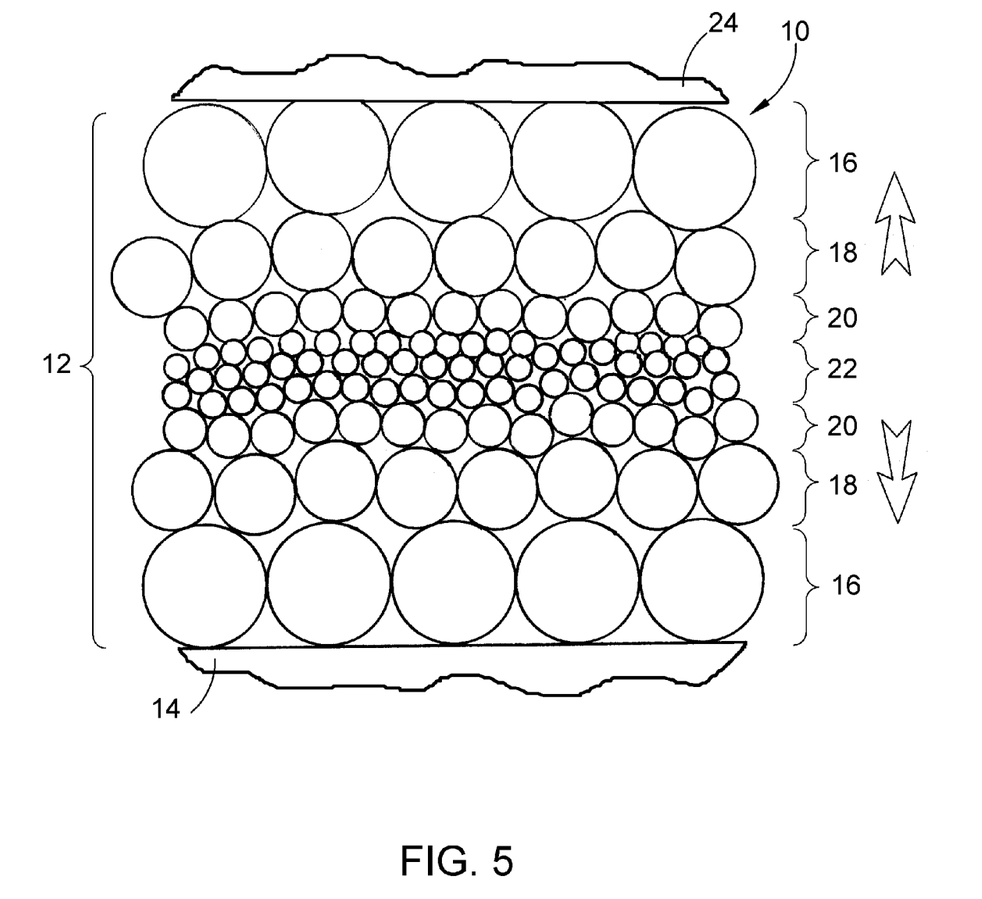
FIG. 5 schematically represents a mass of powder particles between a pair of substrates and arranged similar to that of FIG. 4 to promote microwave brazing of the substrates in accordance with the invention.

As noted above, related U.S. patent application Ser. No. 11/480,652 discloses a technique by which enhanced interaction between a powder mass (e.g., 10 in FIGS. 1 and 2) and microwave radiation can be achieved to promote heating of the mass by appropriately selecting the size and size distribution of particles. In particular, as represented in FIGS. 4 and 5, U.S. patent application Ser. No. 11/480,652 discloses arranging the particles 12 within a powder mass 10 according to particle size so that the particles 12 are progressively arranged within the mass 10 from smallest 22 to largest 16. It is known that the magnetic loss component of susceptibility for a material in very fine powder size is dependent on factors such as microwave power and frequency (e.g., about 3 GHz frequency for 10 nm cobalt particles at about 1 kW power). Conversely, for a given microwave power and frequency, the interaction between microwave and individual metals or alloys will be optimum at a distinct particle size, usually on the order of a few tens of nanometers for conventional microwave conditions (about 2.45 GHz and about 1 to about 10 kW power). Particle sizes above or below that size will not couple as well with the microwave radiation.

On the basis of the above, an optional aspect of the invention is to form the powder particles 12 of a suitable filler metal composition in a number of different particle sizes, alloy the particles 12 with one or more of the high-susceptibility materials noted above and/or mix the particles 12 with particles 32 of one or more of the high-susceptibility materials noted above, and arrange the particles 12 (and 32, if present) in a progressively layered or graded manner as shown in FIGS. 4 and 5. In FIG. 4, representing a technique for braze repairing a substrate 14, the finest powder particles 22 form the outermost layer of the powder mass 10, with gradually coarsening powders 20, 18, and 16 in successive layers beneath the outer layer of finest particles 22 so that the largest particles 16 are adjacent and contact the substrate 14. In FIG. 5, representing a joining operation of two substrates 14 and 24, the finest powder particles 22 are located within an interior region of the powder mass 10, with gradually coarsening powders 20, 18, and 16 in successive layers toward the exterior of the mass 10 so that the largest particles 16 are adjacent and contact the substrates 14 and 24. By forming the mass 10 to have a progressive particle size distribution as shown in FIGS. 4 and 5, the powder mass 10 progressively couples with the microwave energy 26, in which the smallest particles 22 couple first and most readily with the microwave energy 26 so as to be heated by the microwave energy 26 at a faster rate, and the largest particles 16 couple last and less readily with the microwave energy 26 so as to be heated by the microwave energy 26 at a relatively slower rate, resulting in a progression or directionality of heating that follows the progression of particle size as indicated by the arrows in FIGS. 4 and 5. Initially, the smallest particles 22 are preferentially susceptible to the microwave radiation 26 up to the point of melting, and then activate the coarser layers of particles 16, 18, and 20 as these layers increase in temperature as a result of contacting each successively hotter layer. If combined with the second approach to the invention, this technique can further promote the ability to microwave braze substrates 14 and/or 24 with filler metal particles 12 formed of alloys having the very same composition as the substrate 14/24, as well as alloys with the same or even higher melting point as the substrate 14/24.

This heating mechanism takes advantage of the fact that metallic powders are significantly more susceptible to microwave heating than bulk metals, which reflect microwave radiation, and that the susceptibility of materials to microwave radiation increases with increasing temperature. By localizing particles 12 of sufficiently small size (e.g., particles 22) to effectively couple with the microwave energy 26 applied, complete melting can be initiated in the particles 22, with the microwave energy 26 and resulting molten particles combining to cause the adjacent and slightly larger particles (e.g., 20) to completely melt, with this process directionally progressing through the mass 10 toward the largest particles 16. With this approach, the fraction of the smallest particles 22 could be anywhere between 0 to 100%. Generally speaking, if using the conventional microwave conditions noted above, it is believed that a maximum size for the largest particles 16 is preferably on the order of about 100 mesh (about 150 micrometers), whereas a minimum size for the smallest particles 22 can be as little as nanoscale-sized, e.g., less than 100 nanometers such as on the order of about 10 nanometers.

To further improve the particle-microwave interaction, the substrates 14 and/or 24 can be preheated prior to microwave brazing to enhance the susceptibility of the filler metal particles 12 to microwave heating and thereby facilitate melting of the particles 12. Preheating can be performed by any suitable means, such as with conventional radiative or inductive methods, with the use of a susceptor (e.g., SiC) media that will heat to very high temperatures when exposed to microwave radiation, or with a microwave-induced plasma as described in U.S. Pat. No. 6,870,124. Depending on the material used as the particles 12, a minimum preheat temperature is believed to be about 250° C., more preferably about 400° C., in order to have a significant impact on particle-microwave interaction, with maximum temperatures limited by the desire to avoid any microstructural change in the substrates 14 and 24.

While particularly directed to processes that involve joining or repairing superalloys, the present invention is also applicable to other metallic alloy systems. Nonmetallic systems can also be bonded with the filler metal particles 12 in the manner described above as long as the nonmetallic substrates being repaired or bonded contain one or more reactive elements, such as titanium, hafnium, zirconium, etc., as is done in conventional active metal brazing (AMB) of ceramic materials. Suitable combined levels of reactive elements in the particles 12 are believed to be up to about 10 weight percent of the particles 12.

Microwave radiation is preferably applied to the powder mass 10 in a multi-mode cavity, which as known in the art provides for a microwave field that does not establish a standing wave, but instead provides a uniform amplitude of both its magnetic and electric components. Alternatively, a single-mode cavity can be used, in which case a standing or traveling wave is propagated, enabling imposition, to a certain extent, the relative amplitudes of the electric and magnetic components of the microwave field. A wide range of microwave frequencies could be used with the present invention, though regulations generally encourage or limit implementation of the invention to typically available frequencies, e.g., 2.45 GHz and 915 MHz, with the former believed to be preferred. However, it should be understood that other frequencies are technically capable of use. A benefit of using a lower frequency is the greater associated wavelength, which may be better suited for higher power transmission or processing of larger components. Suitable microwave power levels will depend on the size and composition of the particles 12, but are generally believed to be in a range of about 1 to about 10 kW, though lesser and greater power levels are also foreseeable.

In view of the above, it can be appreciated that the present invention enables microwave brazing with filler metal particles 12 that do not require a melting point suppressant and can be completely melted without the use of a secondary indirect heat source, such as an external SiC susceptor. Whereas conventional filler metal powders intended for brazing operations tend to absorb only a limited amount of microwave energy that is insufficient for fully melting the powder particles, particularly if only a small quantity of powder is applied as is the case when repairing a crack in the surface of a turbine nozzle, the improved interaction between microwave radiation 26 and the filler metal particles 12 achieved with this invention enables much faster heating of the particles 12 and reduces the amount of power and energy required to perform a brazing operation. The lower power requirement also reduces the risk of arcing in the microwave chamber, which tends to occur as a result of gas ionization when directing a high power microwave field onto a metallic body and results in decoupling and cessation of heating and potentially damage to the component.

In an investigation leading up to the present invention, microwave heating experiments were conducted in a multi-mode microwave cavity. In a first experiment, about 25 g of a silicon powder sieved to −325 mesh (less than about 45 micrometers) was readily melted by microwave radiation at frequency and power levels of about 2.45 GHz and about 1 kW, respectively. In a second experiment, microwave radiation at the same frequency and power levels was applied to about 25 g of a nickel powder, about 25 g of a chromium powder, and about 25 g of powder of a known braze alloy (Ni430:Ni-19Cr-10Si), each of which had been sieved to −325 mesh (less than about 45 micrometers). Significant heating of the powders was achieved, though no melting occurred. FIG. 3 is a graph plotting dielectric property measurements conducted on the silicon powder, which revealed the previously-noted irreversible increase in loss factor (tan delta) of about two orders of magnitude (about 100×). Such an increase would have the effect of significantly promoting heating of these powders if later subjected to heating by microwave radiation.

In another experiment using the same multi-mode microwave cavity, about 5 grams of a nanoscale-sized nickel powder and about 25 g of a nickel powder sieved to −325 mesh were subjected to microwave radiation at frequencies of about 2.45 GHz and power levels of about 1 kW. A maximum temperature of about 1140° C. (about 2085° F.) was obtained for the finer nickel powder, while the coarser nickel powder only attained a temperature of about 817° C. (about 1500° F.), evidencing the greater susceptibility of the finer powder particles to heating by microwave radiation.

While the invention has been described in terms of particular embodiments, it is apparent that other forms could be adopted by one skilled in the art. Accordingly, the scope of the invention is to be limited only by the following claims.

The invention claimed is:

1. A brazing process comprising:
   providing a mass of at least a first powder comprising a quantity of filler particles of a metallic composition, the mass further containing at least one constituent that is more highly susceptible to microwave radiation than the metallic composition;
   subjecting the mass to microwave radiation so that the filler particles within the mass couple with the microwave radiation and the at least one constituent within the mass preferentially couples with the microwave radiation, wherein a sufficient amount of the at least one constituent is present in the mass so that the filler particles completely melt when subjected to heating by the microwave radiation and thermal contact with the at least one constituent; and then
   interrupting the microwave radiation and allowing the mass to cool, solidify, and form a solid brazement.

2. The process according to claim 1, wherein prior to the subjecting step:
   the mass is thermally pretreated so that the filler particles within the mass increase in temperature but do not melt, and undergo an irreversible increase in the dielectric loss factor thereof; and then
   the pretreatment is interrupted to allow cooling of the mass.

3. The process according to claim 2, wherein the filler particles are subjected to microwave radiation during the thermal pretreatment.

4. The process according to claim 1, wherein the at least one constituent is chosen from the group consisting of silicon, germanium, gallium, cobalt, iron, zinc, titanium, carbon, aluminum, tantalum, niobium, rhenium, hafnium, and molybdenum.

5. The process according to claim 1, wherein the mass contains up to 50% by weight of the at least one constituent.

6. The process according to claim 1, wherein the mass contains about 1% to about 25% by weight of the at least one constituent.

7. The process according to claim 1, wherein the at least one constituent is alloyed with the metallic composition of the filler particles.

8. The process according to claim 1, wherein the at least one constituent is present in the mass as discrete particles that are intermixed with the filler particles.

9. The process according to claim 1, wherein prior to the subjecting step the first powder is arranged within a mass according to size of the particles so that the particles are progressively arranged within at least a region of the mass from smallest to largest in a direction of progression through the mass, and during the subjecting step the particles within the mass progressively couple with the microwave radiation according to size, the smallest particles of the first powder coupling first and heating faster than larger particles of the first powder, and the largest particles coupling last and heating slower than smaller particles of the first powder, such that as a result of the progressive arrangement of the particles the mass is progressively and directionally heated by the microwave radiation in the direction of progression through the mass.

10. The process according to claim 9, wherein the smallest particles are nanoscale-sized.

11. The process according to claim 1, wherein the first powder is arranged on a substrate and the brazement metallurgically bonds to the substrate to form a repair region on the substrate as a result of the melting of the particles and cooling of the mass to form the brazement.

12. The process according to claim 11, wherein the substrate and the metallic composition of the particles have substantially the same melting temperature.

13. The process according to claim 11, wherein the substrate and the metallic composition of the particles are superalloys.

14. The process according to claim 11, further comprising the step of sufficiently preheating the substrate prior to the subjecting step to enhance susceptibility of the filler particles to microwave heating and facilitate melting thereof.

15. The process according to claim 1, wherein the first powder is arranged on a first substrate and the brazement metallurgically bonds the first substrate to a second substrate as a result of the melting of the particles and cooling of the mass to form the brazement.

16. The process according to claim 15, wherein the substrates and the metallic composition of the particles have substantially the same melting temperature.

17. The process according to claim 15, wherein the substrates and the metallic composition of the particles are superalloys.

18. The process according to claim 15, further comprising the step of sufficiently preheating the filler particles and the substrates prior to the subjecting step to enhance susceptibility of the filler particles to microwave heating and facilitate melting thereof.

19. A brazing process comprising:
   providing a mass of at least a first powder comprising a quantity of filler particles of a metallic composition;
   thermally pretreating the mass so that the filler particles within the mass increase in temperature but do not melt, and undergo an irreversible increase in the dielectric loss factor thereof;
   interrupting the thermal pretreatment to allow the mass to cool;
   subjecting the mass to microwave radiation so that the filler particles within the mass couple with the microwave radiation to result in complete melting of the filler particles; and then
   interrupting the microwave radiation and allowing the mass to cool, solidify, and form a solid brazement.

20. The process according to claim 19, wherein the mass further contains at least one constituent that is more highly susceptible to microwave radiation than the metallic composition, and during the subjecting step the at least one constituent within the mass preferentially couples with the microwave radiation to promote melting of the filler particles during the subjecting step.

21. The process according to claim 20, wherein the filler particles are subjected to microwave radiation during the thermal pretreatment.

22. The process according to claim 20, wherein the at least one constituent is chosen from the group consisting of silicon, germanium, gallium, cobalt, iron, zinc, titanium, carbon, aluminum, tantalum, niobium, rhenium, hafnium, and molybdenum.

23. The process according to claim 20, wherein the mass contains up to 50% by weight of the at least one constituent.

24. The process according to claim 20, wherein the mass contains about 1% to about 25% by weight of the at least one constituent.

25. The process according to claim 20, wherein the at least one constituent is alloyed with the metallic composition of the filler particles.

26. The process according to claim 20, wherein the at least one constituent is present in the mass as discrete particles that are intermixed with the filler particles.

27. The process according to claim 19, wherein prior to the subjecting step the first powder is arranged within a mass according to size of the particles so that the particles are progressively arranged within at least a region of the mass from smallest to largest in a direction of progression through the mass, and during the subjecting step the particles within the mass progressively couple with the microwave radiation according to size, the smallest particles of the first powder coupling first and heating faster than larger particles of the first powder, and the largest particles coupling last and heating slower than smaller particles of the first powder, such that as a result of the progressive arrangement of the particles the mass is progressively and directionally heated by the microwave radiation in the direction of progression through the mass.

28. The process according to claim 27, wherein the smallest particles are nanoscale-sized.

29. The process according to claim 19, wherein the first powder is arranged on a substrate and the brazement metallurgically bonds to the substrate to form a repair region on the substrate as a result of the melting of the particles and cooling of the mass to form the brazement.

30. The process according to claim 29, wherein the substrate and the metallic composition of the particles have substantially the same melting temperature.

31. The process according to claim 29, wherein the substrate and the metallic composition of the particles are superalloys.

32. The process according to claim 29, further comprising the step of sufficiently preheating the filler particles and the substrate prior to the subjecting step to enhance susceptibility of the filler particles to microwave heating and facilitate melting thereof.

33. The process according to claim 32, wherein the substrates and the metallic composition of the particles have substantially the same melting temperature.

34. The process according to claim 32, wherein the substrates and the metallic composition of the particles are superalloys.

35. The process according to claim 32, further comprising the step of sufficiently preheating the filler particles and the substrates prior to the subjecting step to enhance susceptibility of the filler particles to microwave heating and facilitate melting thereof.

36. The process according to claim 19, wherein the first powder is arranged on a first substrate and the brazement metallurgically bonds the first substrate to a second substrate as a result of the melting of the particles and cooling of the mass to form the brazement.

* * * * *